May 3, 1938.  R. D. HEYMANN  2,115,772
MACHINE FOR MOLDING PULP
Filed June 18, 1935  13 Sheets-Sheet 1

INVENTOR
Roy D. Heymann
BY Austin & Dix
ATTORNEYS

May 3, 1938.  R. D. HEYMANN  2,115,772
MACHINE FOR MOLDING PULP
Filed June 18, 1935  13 Sheets-Sheet 2

INVENTOR
Roy D. Heymann
BY
Austin & Dix
ATTORNEYS

May 3, 1938.   R. D. HEYMANN   2,115,772
MACHINE FOR MOLDING PULP
Filed June 18, 1935   13 Sheets-Sheet 5
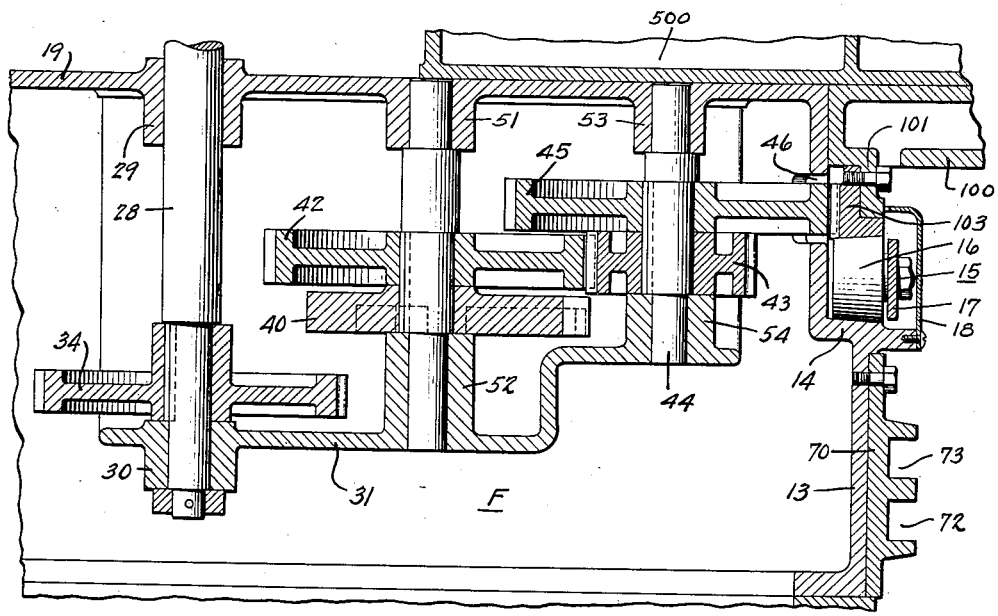
Fig. 5.
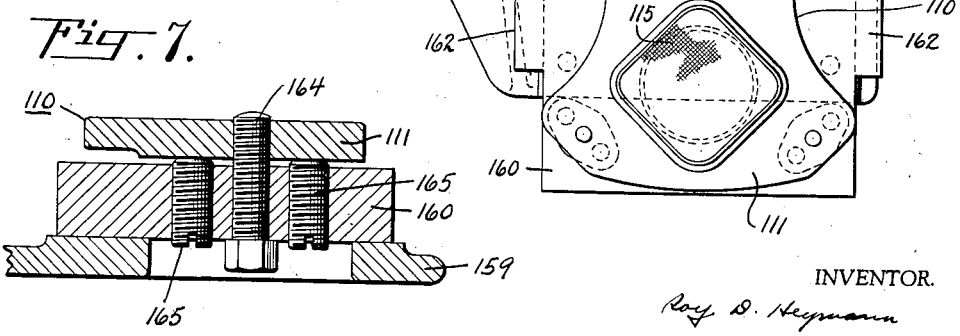
Fig. 6.
Fig. 7.
INVENTOR.
Roy D. Heymann
BY Austin & Dix
ATTORNEYS May 3, 1938.  R. D. HEYMANN  2,115,772
MACHINE FOR MOLDING PULP
Filed June 18, 1935  13 Sheets-Sheet 6

INVENTOR
Roy D. Heymann
BY
Austin & Dix
ATTORNEYS

May 3, 1938.  R. D. HEYMANN  2,115,772
MACHINE FOR MOLDING PULP
Filed June 18, 1935  13 Sheets-Sheet 7

INVENTOR
Roy D. Heymann
BY
Austin & Dix
ATTORNEYS

May 3, 1938.  R. D. HEYMANN  2,115,772
MACHINE FOR MOLDING PULP
Filed June 18, 1935   13 Sheets-Sheet 8

INVENTOR
Roy D Heymann
BY
Austin & Dix
ATTORNEYS

May 3, 1938.   R. D. HEYMANN   2,115,772
MACHINE FOR MOLDING PULP
Filed June 18, 1935   13 Sheets-Sheet 10

INVENTOR.
Ray D. Heymann
BY Austin & Dix
ATTORNEYS

May 3, 1938. R. D. HEYMANN 2,115,772
MACHINE FOR MOLDING PULP
Filed June 18, 1935 13 Sheets-Sheet 11

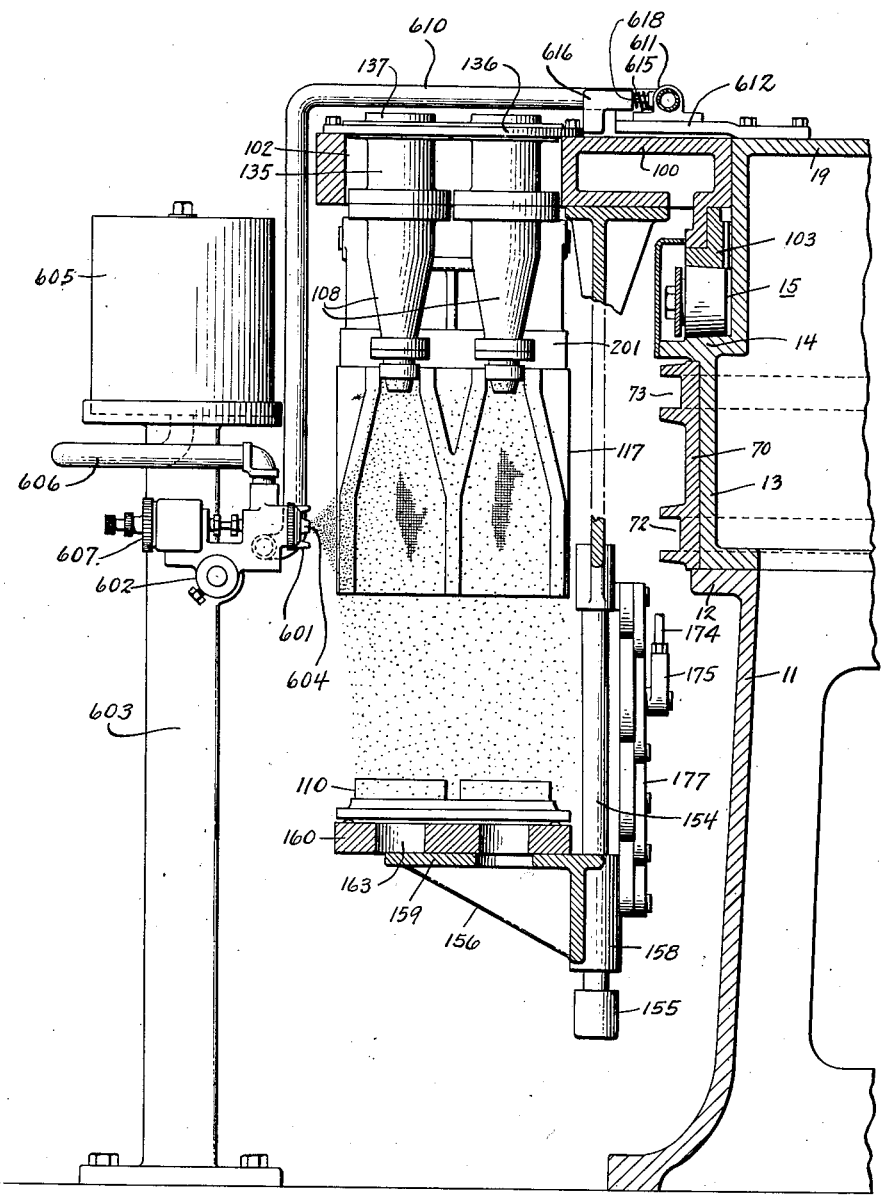

Patented May 3, 1938

2,115,772

UNITED STATES PATENT OFFICE 2,115,772

MACHINE FOR MOLDING PULP

Roy D. Heymann, Woodbridge, Conn., assignor, by mesne assignments, to Pulp Products Company, Inc., New York, N. Y., a corporation of Delaware Application June 18, 1935, Serial No. 27,179

10 Claims. (Cl. 92—54)

This invention relates to machines for molding pulp, and particularly to such machines wherein all of the steps of a pulp molding process may be carried out in a single machine.

The invention relates to a machine adapted for use in a process of molding pulp articles wherein a liquid suspension of pulp fibres is introduced into a foraminous mold, and the liquid is forced out through the walls of the mold, to leave the fibres adhering to the inside of the mold in the form of a matted blanket, after which the matted blanket is compacted and dried in a suitable manner.

The invention consists in the provision of a machine especially adapted for molding pulp according to the afore-mentioned process, in which machine a plurality of molds are brought into registration successively with a plurality of stations, each of which is provided with a mechanism adapted to carry out a portion of a step, or one or more steps, of the molding process in cooperation with each mold during the period that the mold is in registration therewith.

A feature of the invention consists in the provision of a machine of the above-described type wherein the relative movement between the molds and the mechanisms, and wherein the operation of the mechanisms at the proper time, all may be carried out and controlled automatically.

Still another feature of the invention consists in the provision of a machine of the foregoing type wherein a plurality of molds are provided, each of which cooperates successively with the several mechanisms, and wherein all of the mechanisms cooperate with different molds simultaneously to perform their several functions, whereby the machine may be operated at maximum capacity and with maximum utilization of the component parts thereof.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 5 is a vertical cross-section taken along the line 5—5 of Fig. 4, showing a portion of the drive mechanism;

Fig. 6 is a plan view of the supporting bracket for the bottom wall of the mold;

Fig. 7 is a vertical cross-section taken along the line 7—7 of Fig. 6, showing the adjustable attaching means for the mold bottom;

Fig. 16 is a vertical cross-section taken along the line 16—16 of Fig. 1, showing the spraying mechanism.

The machine comprises broadly a stationary support A having eight stations 1 to 8, and a turntable B having eight mold assemblies D, and rotatable on the support A by a driving mechanism C to bring each of the mold assemblies D into registration with the several stations 1 to 8, successively.

Figure 2:
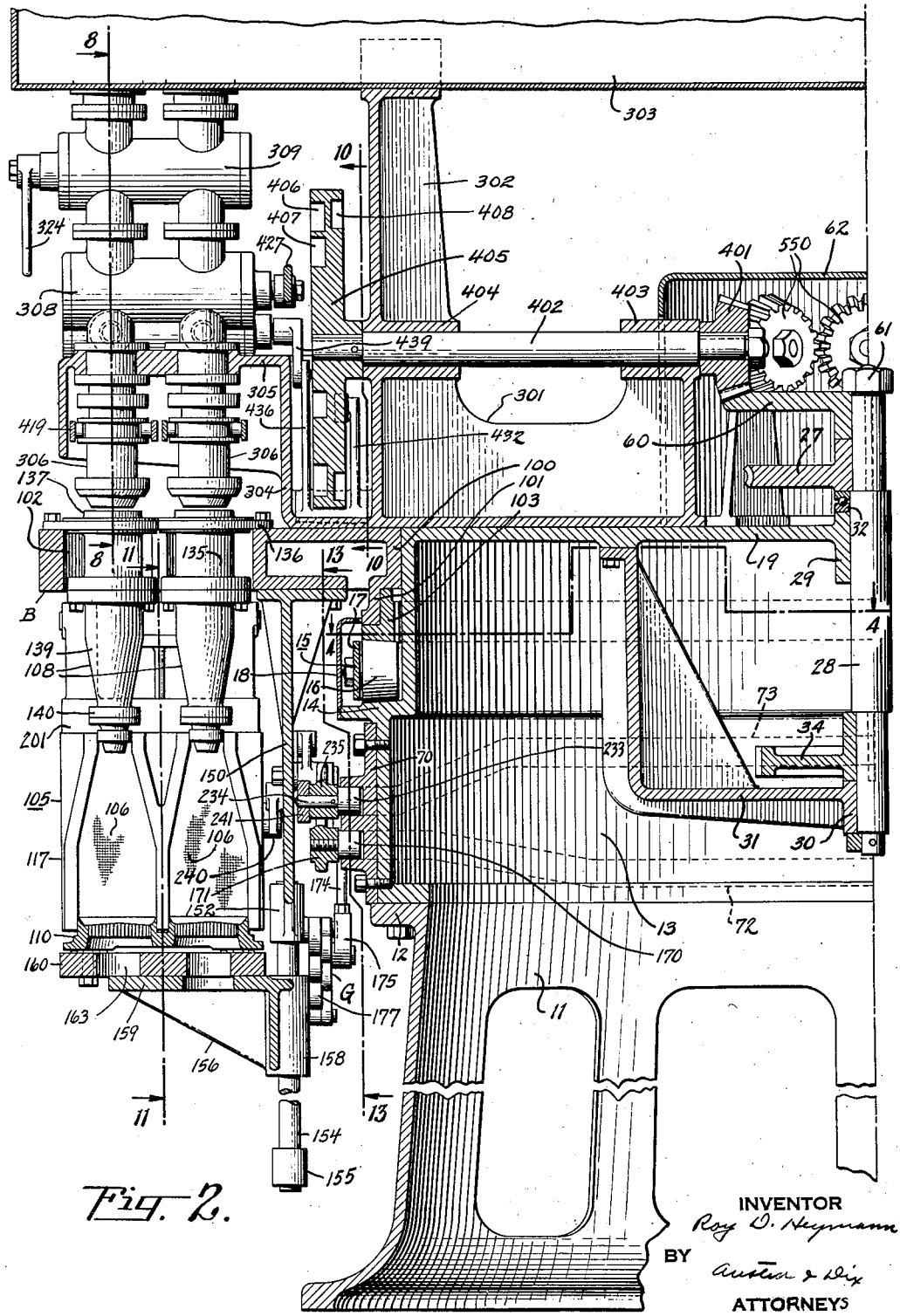
Fig. 2 is a vertical cross-section taken along the line 2—2 of Fig. 1.
Figure 3:
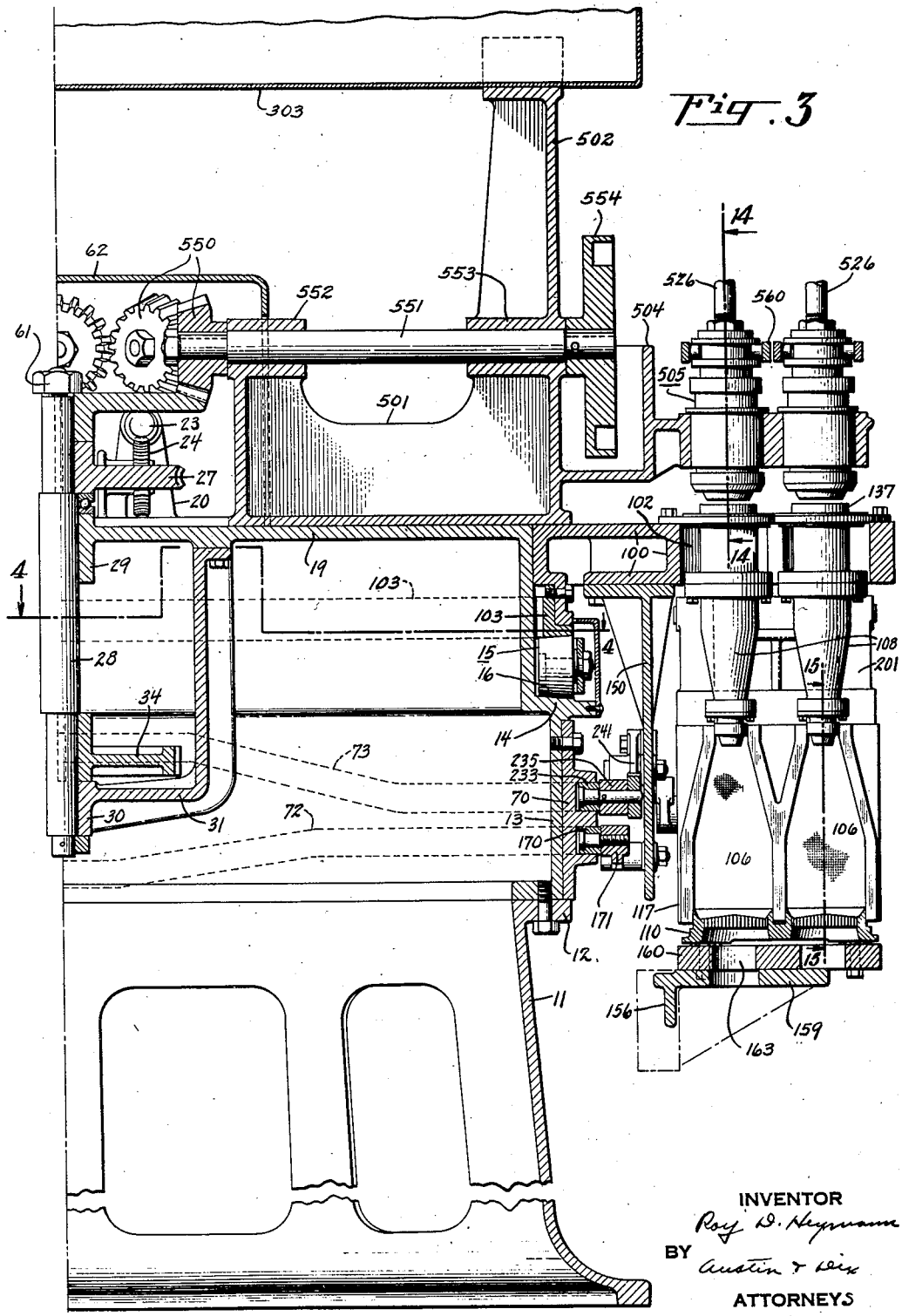
Fig. 3 is a vertical cross-section taken along the line 3—3 of Fig. 1, continuous with Fig. 2.

The stationary support A (Figs. 2 and 3) comprises a standard 11 having a horizontal flange 12 upon which rests a cylindrical drum 13 formed with a horizontal annular ledge 14. Rotatable on the ledge 14 is a circular roller bearing 15 consisting of a plurality of rollers 16 secured to a circular hoop 17 and enclosed by a guard plate 18. Supported rotatably on the bearing 15 is an internally toothed ring gear 103 secured to a depending flange 101 integral with an annular frame 100 constituting the principal element of the turntable B.

Drive mechanism

The turntable B is rotated intermittently on the bearing 15, by the drive mechanism C driven by a suitable source of power (not shown).

Figure 1:
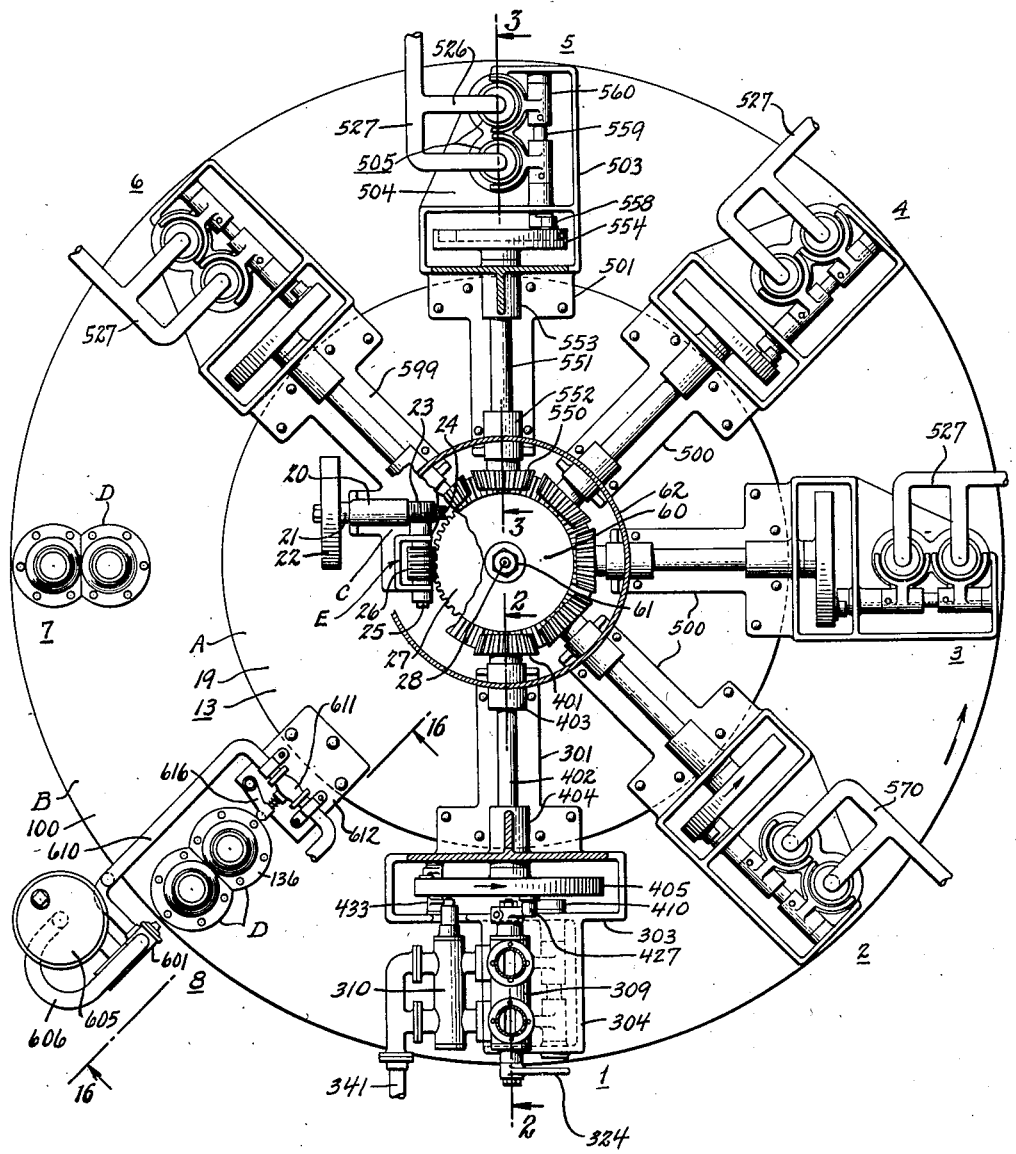
Fig. 1 is a top plan view showing a machine constructed according to the present invention, with the pulp suspension supply tank removed.

A bracket 20 (Fig. 1) is supported on the top wall 19 of the drum 13, and mounts a shaft 21 carrying a drive pulley 22, and a worm 23. The worm 23 drives a worm wheel 24 fixed on a shaft 25 rotatably supported in the bracket 20, and carrying a worm 26 which meshes with a worm wheel 27 fixedly mounted on a main drive shaft 28. The shaft 28 is rotatably supported in a guide bearing 29 (Figs. 2 and 3), integral with the drum 13, and a second guide bearing 30 integral with a bracket 31 secured to and depending from the top wall 19 of the drum; a ball bearing 32 seated on the upper end of the bearing 29 supports the gear 27, and serves as a thrust bearing for the shaft 28. The gearing connected between the drive pulley 22 and the main drive shaft 28 constitutes a reduction gearing E which may suitably have any desired speed ratio.

Figure 4:
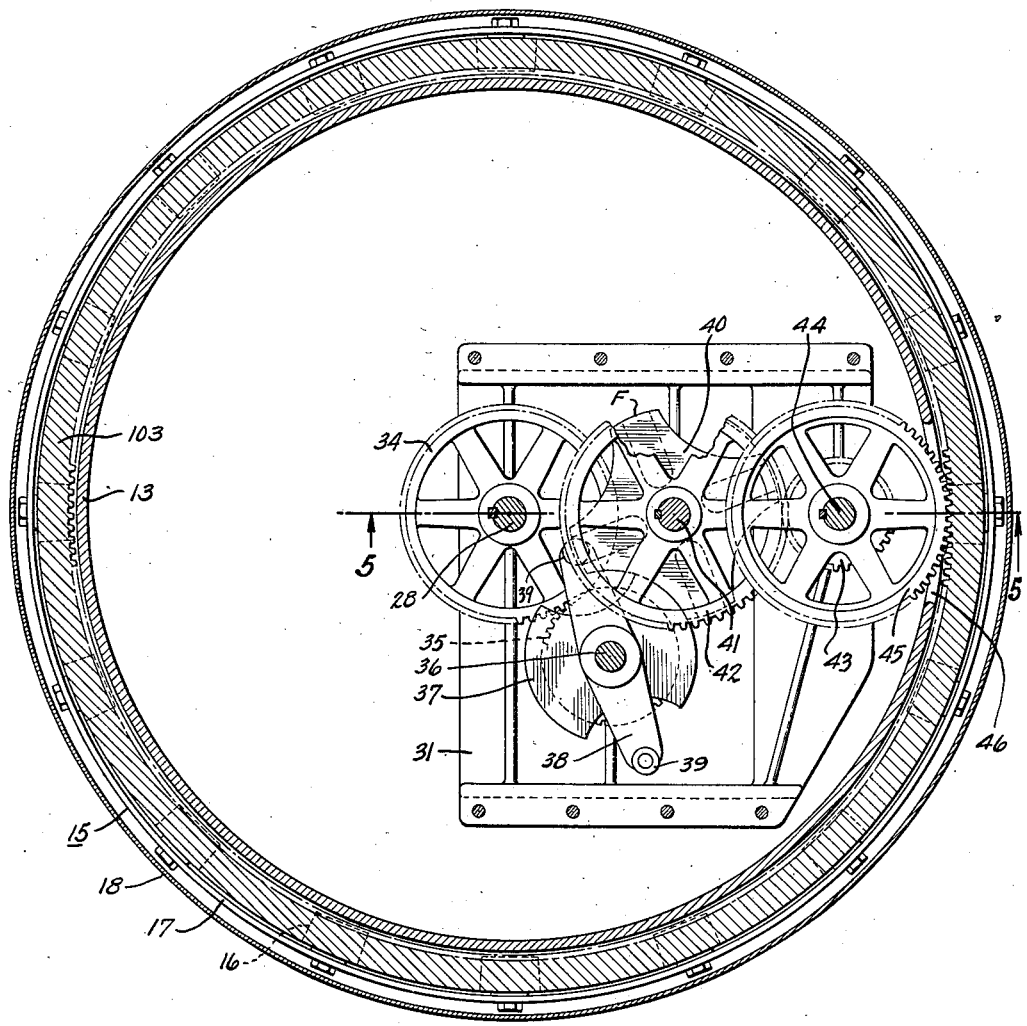
Fig. 4 is a horizontal cross-section taken along the line 4—4 of Figs. 2 and 3, showing a portion of the drive mechanism.

Secured on the lower end of the shaft 28 is a spur gear 34 (Figs. 4 and 5) which drives an intermittent gearing F consisting of a gear wheel 35, keyed to shaft 36 carrying a segmental wheel 37 and a lever 38 provided with rollers 39 at each end, adapted to alternately engage a star wheel face plate 40 carried on a shaft 41, which also carries a spur gear 42 meshing with a spur gear 43 carried on a shaft 44 which mounts a drive gear 45. The drive gear 45 projects through an opening 46 in the drum, and meshes with the ring gear 103. The shaft 41 is carried in bearings 51 and 52 formed integral with the drum 13 and bracket 31, respectively, and the shaft 44 is mounted in bearings 53 and 54, also formed integral with the drum 13 and the bracket 31, respectively; the shaft 36 is similarly mounted in bearings (not shown) formed in the drum 13 and the bracket 31.

It will now be seen that rotation of the drive pulley 22 energizes the reduction gearing E to drive the main drive shaft 28, which rotates the gear 34 to effect the operation of the intermittent gear mechanism F, thus rotating the ring gear 103 intermittently to produce a step-by-step rotation of the turntable B on the bearing 15. The reduction gearing E and the intermittent gearing F are designed to rotate the turntable B one-eighth of a revolution in each period of movement. The duration of the steps may be any desired time, and in one embodiment of the invention the driving arrangement is such that the time the turntable is halted is equal to the time required to rotate it ⅛ of a revolution.

The frame 100 is formed with eight vertical openings 102 spaced about its circumferential portion, at each of which is located one of the mold assemblies D.

Mold unit

Each of the mold assemblies D consists essentially in a sectional mold 105 having two cavities 106, a pair of inlet tubes 108, and suitable mechanism G for supporting the mold 105 and controlling the opening and closing thereof. The mold 105 and the inlet tubes 108 comprise the "mold unit."

Figure 15:
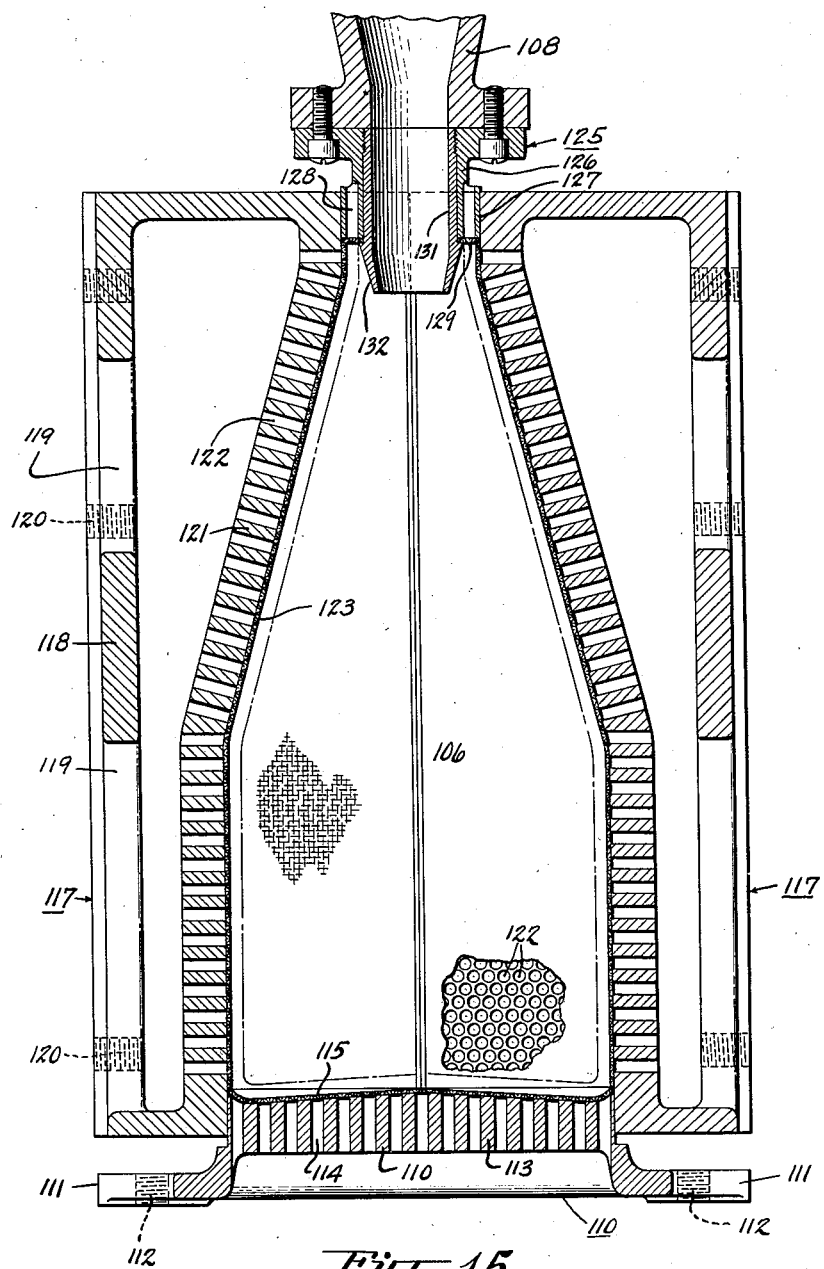
Fig. 15 is a vertical cross-section taken along the line 15—15 of Fig. 3, showing the mold.

Each mold (Fig. 15) comprises a bottom 110, a pair of sides 117, and a top 125. The bottom 110 is formed with a supporting portion 111 having threaded attaching openings 112 and an offset wall portion 113, having a plurality of closely spaced perforations 114. Lying against the inner side of the wall portion 113, and overlying the perforations 114, is a screen 115.

Each side 117 comprises a supporting portion 118 having openings 119 and threaded attaching openings 120 and formed integral with a wall portion 121 provided with closely spaced perforations 122. Lying against the inner side of the wall portion 121, is a screen 123 which overlies the perforations 122.

Each top 125 consists in a top member 126 having a wall portion 127 clamped between the sides 117, and provided with a plurality of closely spaced perforations 128, a duct or nozzle 131 threaded into the top member 126 and having a tapered end 132 projecting into the cavity 106 defined by the wall portions 113, 121 and 127; a screen 129 is secured between the duct 131 and the top member 126.

Figure 8:
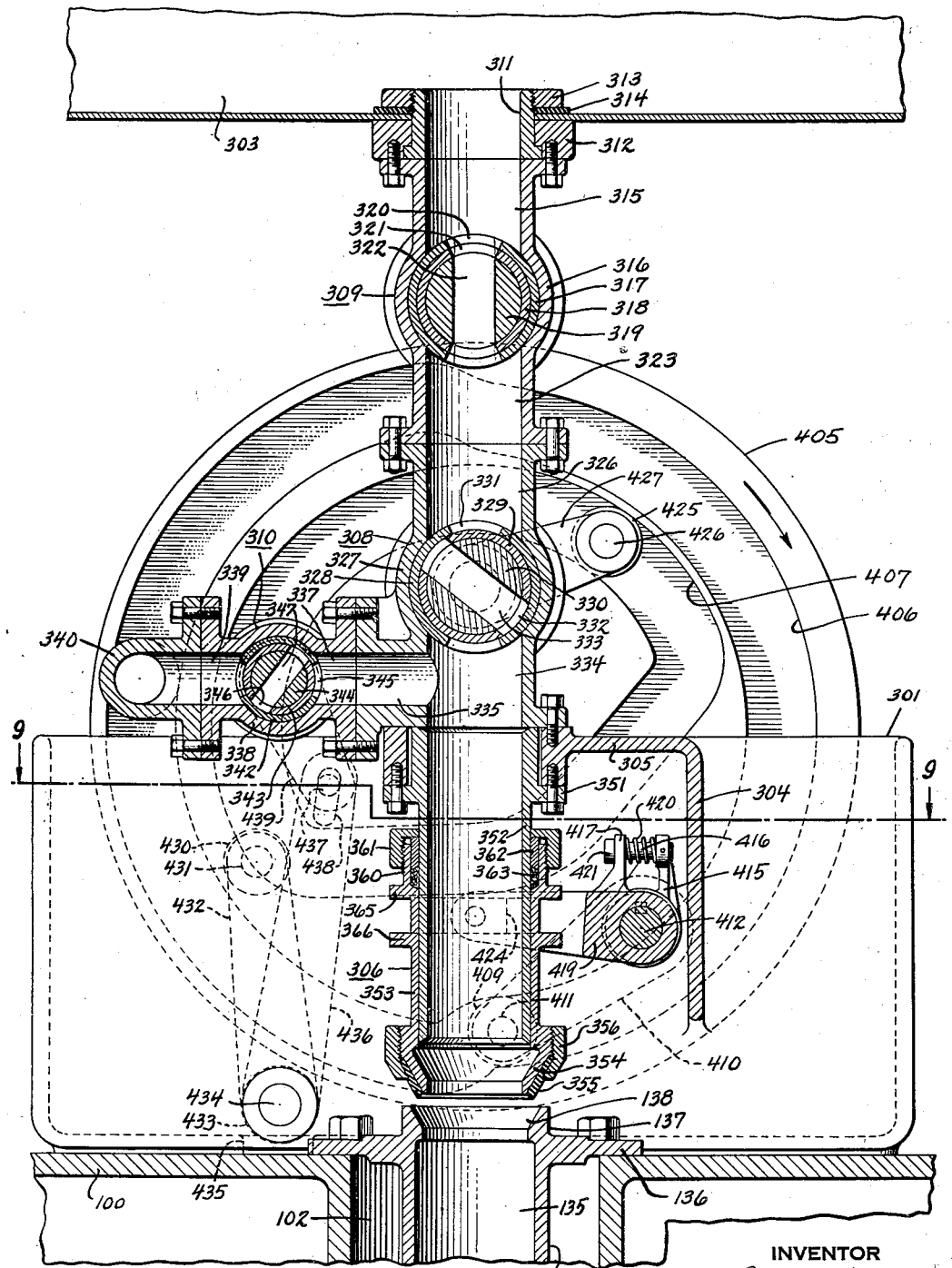
Fig. 8 is a vertical cross-section taken along the line 8—8 of Fig. 2, showing the liquid-charging mechanism.
Figure 9:
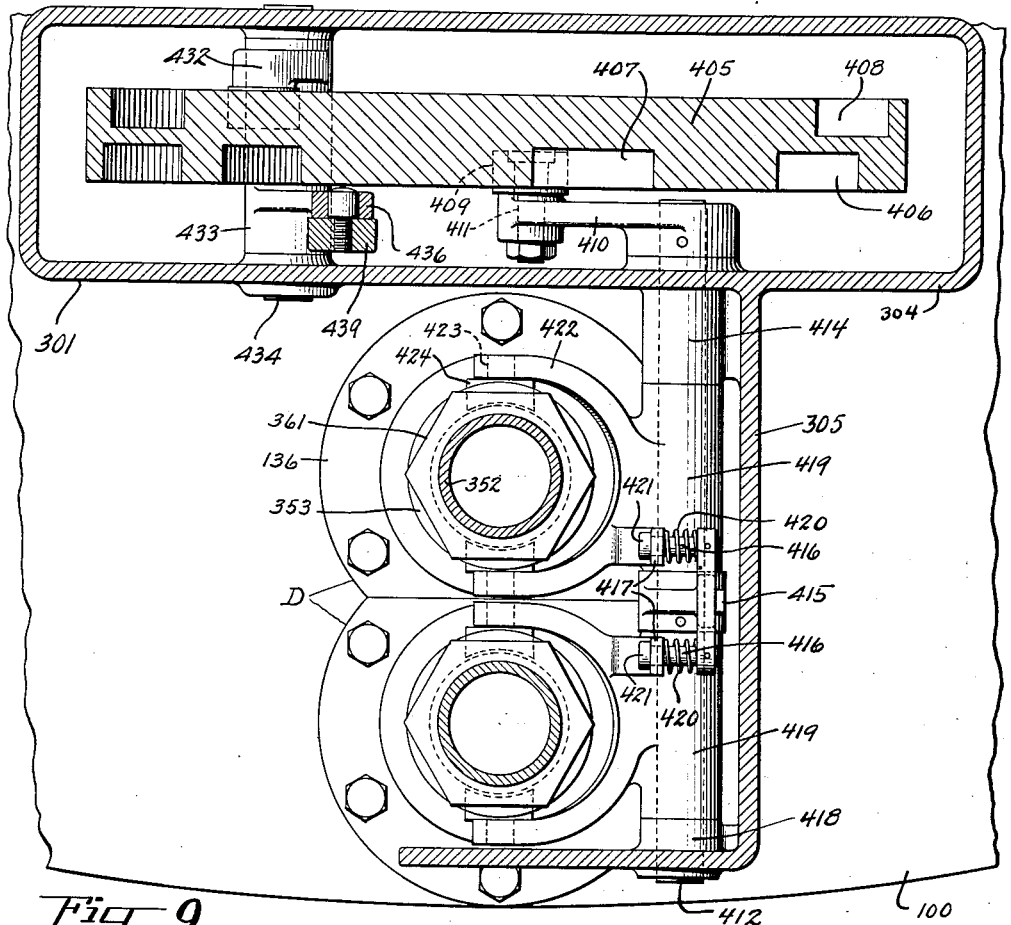
Fig. 9 is a horizontal cross-section taken along the line 9—9 of Fig. 8.

Supporting each top 125, and in alignment with the duct 126, is the inlet tube 108 (Figs. 2 and 3), having a cylindrical section 135, formed with a flange 136 resting upon the drum 100, and a tapered section 139 attached to the cylindrical section and to the top. The cylindrical section 135 (Fig. 8) extends through the opening 102, and has an extension or projecting portion 137 formed with a flared opening 138. The tapered section 139 has a flange 140, to which the top 125 is attached.

Mold bottom supporting and operating mechanism

Figure 11:
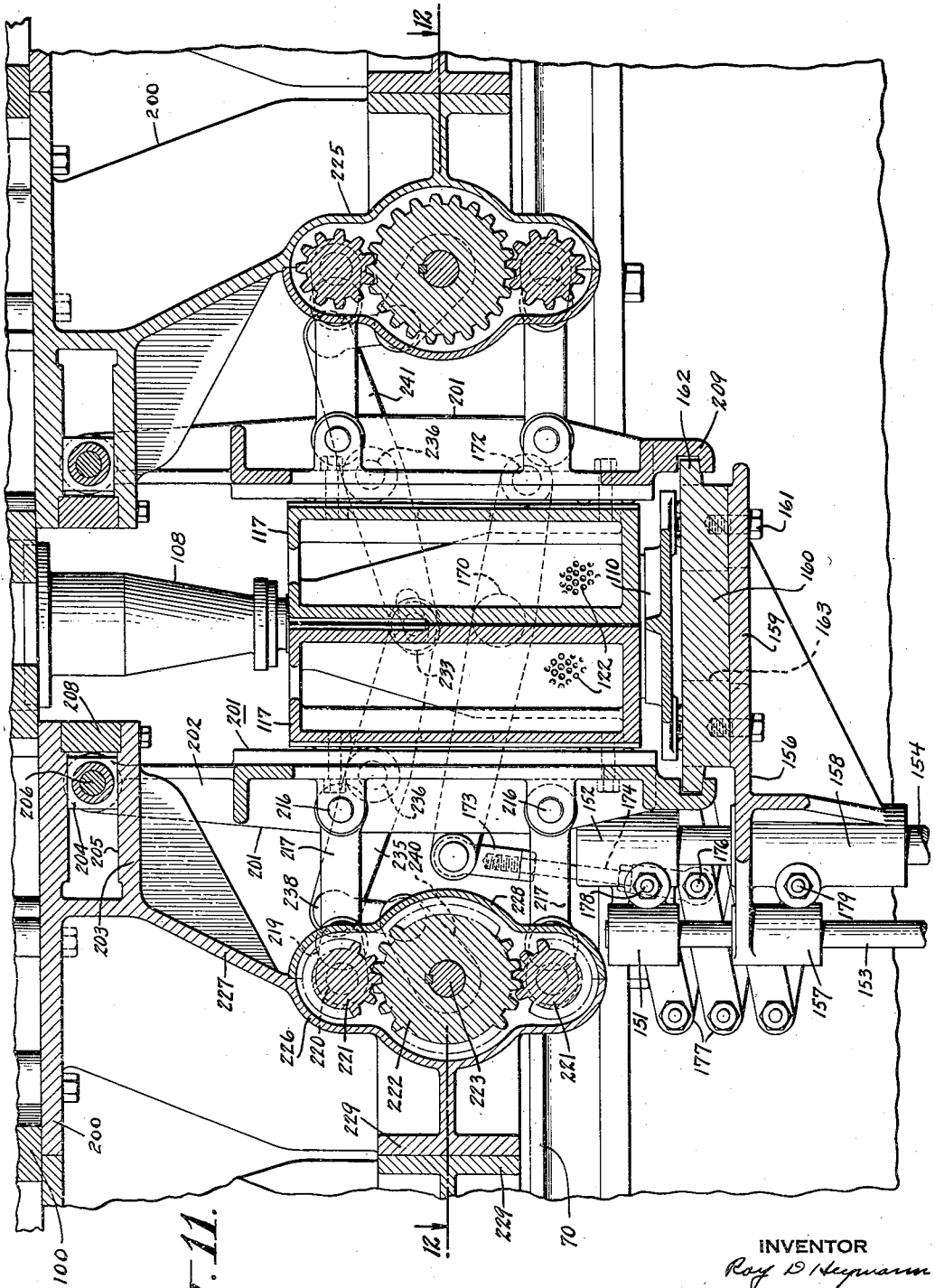
Fig. 11 is a vertical cross-section taken along the line 11—11 of Fig. 2, showing the mold operating mechanism, with the mold parts shown in closed position.
Figure 12:
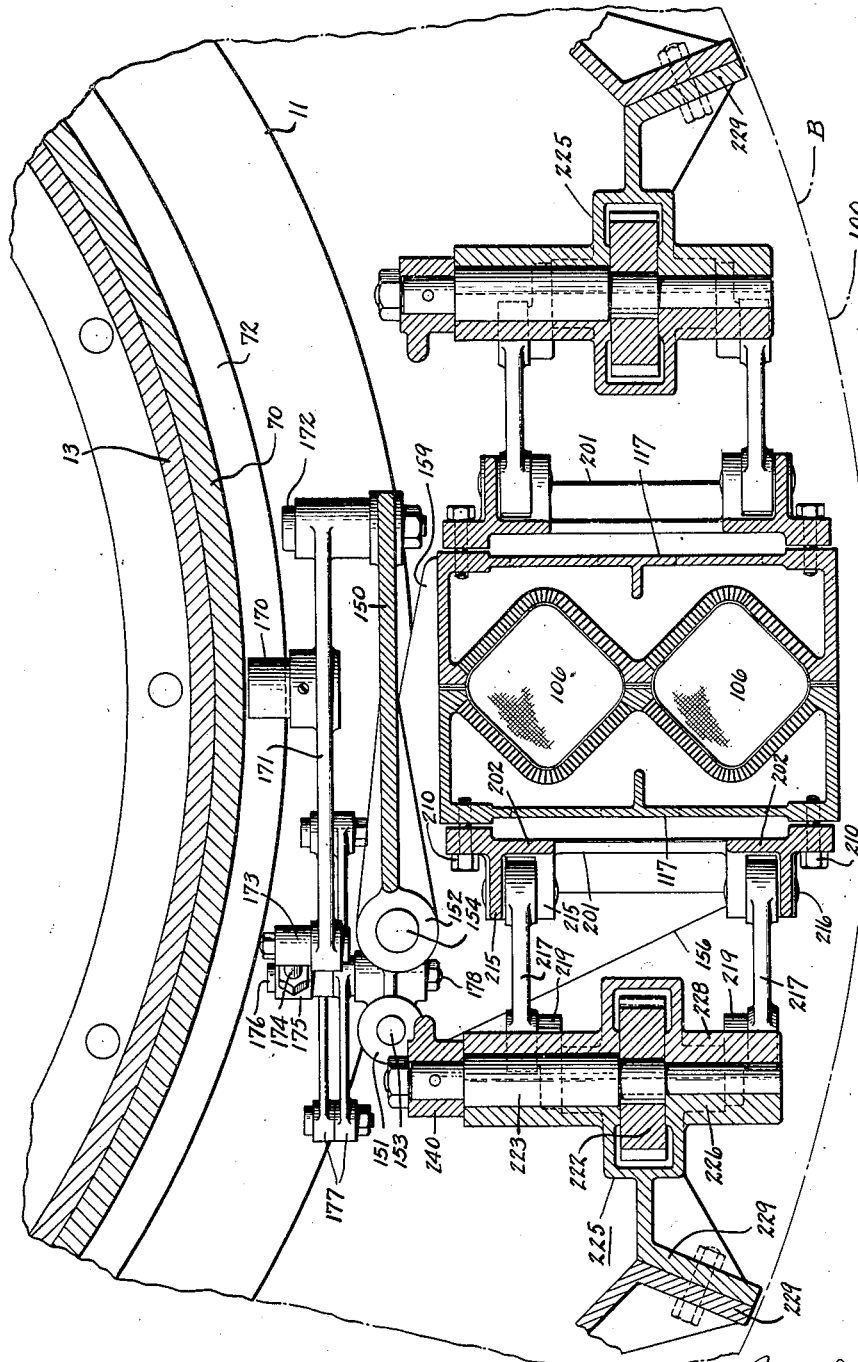
Fig. 12 is a horizontal cross-section taken along the line 12—12 of Fig. 11.
Figure 13:
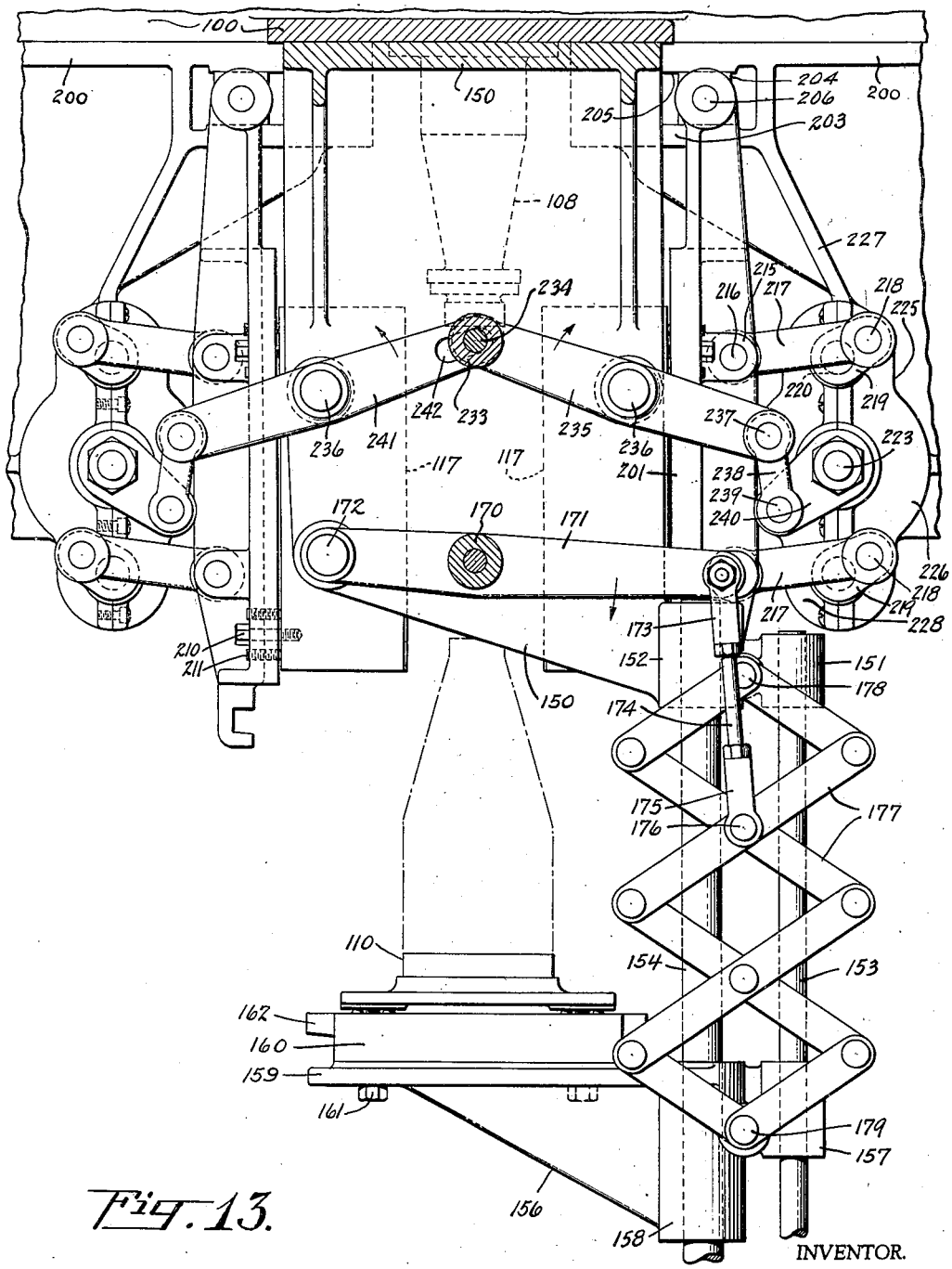
Fig. 13 is a vertical cross-section taken along the line 13—13 of Fig. 2, with the mold parts shown in open position.

Depending from the frame 100 (Figs. 11, 12 and 13), is a vertical bracket 150 formed with integral bosses 151 and 152, in which are secured parallel, depending rods 153 and 154, secured at their lower ends by a clamp 155. Slidable on the rods 153 and 154 is a supporting bracket 156, having bosses 157 and 158, bored to receive the rods 153 and 154, respectively.

The bracket 156 is provided with a horizontal shelf portion 159, on which is carried a supporting block 160 secured to the shelf 159 by screws 161. The block is provided with lateral flanges 162 and openings 163 for purposes which will hereinafter appear.

Extending through the block 160 (Figs. 6 and 7), are screws 164 which are threaded into the openings 112 in the bottom 110 of the mold 105. Threaded into, and extending through the block 160, adjacent the screws 164, are set screws 165 which cooperate with the screws 164 in providing a leveling adjustment of the bottom 110 on the block 160.

The bracket 156, carrying the bottom 110, is movable vertically on its supporting rods 153 and 154 by the coaction between a cylindrical cam 70 secured to the vertical wall of the drum 13, and a cam roll 170 carried on a lever 171 pivotally connected to the depending bracket 150 by a pivot pin 172. Pivotally attached to the free end of the lever 171 is a connecting rod socket 173, in which is screwed a connecting rod 174 screwed at its other end into a second socket 175, pivotally attached by a pivot pin 176 to a lazy tong element 177. The ends of the connecting rod 174 are oppositely threaded into their respective sockets 173 and 175, thus permitting the bracket 156 to be vertically adjusted by turning the connecting rod 174.

The lazy tong element 177 is fixed at one end to the bracket 150 by a connecting pin 178, and is connected at the other end by a pin 179 to the vertically movable bracket 156. The cam member 70 is formed with a groove 72 of such shape that, as the roll 170 moves along the groove, the lever 171 is moved angularly about its pivot pin 172 to extend and retract the lazy tong element 177, to thereby raise and lower the bracket 156.

*Mold side supporting and operating mechanism*

Inasmuch as the mechanisms for supporting and operating the sides of the mold is the same for each side, except where noted, only one such mechanism will be described.

Depending from the frame 100 is a bracket 200 from which is supported a vertical side-supporting bracket 201 (Figs. 11, 12 and 13), having a pair of spaced arms 202, depending from a block 204, horizontally slidable in a way 205 formed in an integral portion 203 of the bracket 200; the block is pivotally connected to the arms 202 by a wrist pin 206, and the end of the way is closed by a block 208.

The mold side 117 is secured to the side-supporting bracket 201 by a plurality of bolts 210 extending through the side-supporting bracket 201 and threaded into the openings 120 in the mold side 117. A plurality of set screws 211 adjacent to each of the bolts 210 serve to adjust the position of the mold side 117 with respect to the side-supporting bracket 201.

At the lower end of the side-supporting bracket 201 is a portion 209 formed with a horizontal groove having a tapered lower wall adapted to cooperate with the lateral lug 162 formed on the bottom-supporting block 160, for a purpose which will hereinafter be described.

Formed integrally on the side-supporting bracket 201 are four pairs of spaced lugs 215, each of which supports a wrist pin 216 on which pivot links 217, each of which is connected by a pin 218 to a crank arm 219. The crank arms 219 are carried on shafts 220 mounted in a gear housing 225, constituted by a portion 226 integral with a depending portion 227 of the bracket 200 and a cover 228. The shafts 220 carry spur gears 221 meshing with a drive gear 222, keyed to a shaft 223, also journalled in the gear housing 225. Formed integral with each gear housing portion 226 is a flange 229 which is attached to a similar flange 229, formed on the gear housing portion 226 of the adjacent mold group to serve as supporting and steadying means for the mold operating mechanism G.

The gear 222 is driven from the cam 70 by a cam roll 233 cooperating with a groove 73 in the cam, which roll is connected by a pin 234 to the ends of a pair of rockable levers 235 and 241, each of which is pivoted to the bracket 150 by a pin 236. One of the levers 241 is formed with a slot 242 to permit a toggle action with the lever 235. The lever 235 is attached at its other end by a pivot pin 237 to a link 238, which in turn is pivoted by a pin 239 to a crank arm 240. It will be seen that vertical movement of the rolls 233 will cause the levers 235 and 241 to rock about their pivots 236 and rotate the gears 222 through the crank arm 240, thus rotating the gears 221 to actuate the cranks 219 and extend the links 217 to move the brackets 201 toward one another, thus closing the sides 117.

Assuming the rolls 170 and 233 to be in engagement with their respective grooves in the cam 70 at the portions wherein the grooves have a maximum separation, as the rollers pass onto the portion of the grooves wherein the lower groove 72 rises and the upper groove 73 drops, the roll 170 is raised, causing the free end of the lever 171 actuating the lazy tong 177 to raise the bottom-supporting bracket 156. Also, the roll 233 is lowered to actuate the closing mechanism for the sides 117, and move the sides 117 into their closed position engaging the bottom 110 and each other. When the rolls 170 and 233 move into portions of the grooves 72 and 73, wherein the grooves have minimum separation, the mold is closed in a manner which will now be apparent.

In the closed position of the mold supporting members, the grooved portions 209 of the side-supporting brackets 201 engage the lateral flanges 162 on the block 160, and the inclined surfaces serve to lift the block 160, whereby the bottom 110 and the bracket 156 are supported principally by the brackets 201. Thus, when fluid under pressure is admitted to the mold, as will later be explained, and the bottom tends to be forced downwardly, no strain is put upon the operating mechanism connected to the bracket 156. In order that the mold 105 may be opened and closed, the operating mechanism is so adjusted that the bottom bracket 156 reaches its closed position prior to the side-supporting brackets 201, thus permitting the portions to move horizontally into engagement with the flanges 162.

The mold bottom 110 and the sides 117 may be adjusted on the block 160 and the side supporting brackets 201, so that, when in closed position, they meet at all corresponding portions. The adjustment may be accomplished by suitably manipulating the leveling screws 165 (Figs. 7 and 13) of the block 160 and the leveling screws 211 (Fig. 13) of the brackets 201.

*Charging mechanism*

Supported on the top wall 19 of the drum 13 at station 1 (Fig. 2) is a bracket 301 having an upstanding arm 302 supporting one end of a pulp tank 303 adapted to contain a water suspension of pulp fibres or other liquid material. The bracket 301 is formed with a housing portion 304 at its outer end, from which extends an overhanging shelf 305 which supports a pair of charging tubes 306 controlled by pulp valve 308, a regulating valve 309, and a water valve 310.

A pair of outlet pipes 311 (Figs. 2 and 8) project into the pulp tank 303, and each is secured thereto by a shouldered ring 312 bearing against the outer face of the bottom wall, and a nut 313 threaded onto the end of the pipe 311 and compressing a gasket 314 against the inner face of the wall of the pulp tank 303.

Secured to and aligned with the outlet pipes 311 are throats 315 upstanding from and integral with a valve housing 316, housing the double valve 309. Fixed in the valve housing is a valve bushing 317 in which is fixed a second valve bushing 318, mounted on and attached to a valve drum 319. The valve bushings 317 and 318, and the valve drum 319 are formed with openings 320, 321 and 322, respectively, which, when in alignment, provide a communication between the upstanding throats 315 and throats 323 depending from and integral with the valve housing 316. Secured on the valve drum 319, and outside of the valve housing 316, is an operating lever 324 by which the valve drum 319 and the bushing 318 may be rotated in the housing to control the opening and closing of the passage through the valve.

Secured to and in alignment with the depending throats 323, are upstanding throats 326 formed integral with a second valve housing 327 enclosing the double valve 308. The valve housing 327 fixedly carries a valve bushing 328, a second valve bushing 329 rotating in the first bushing 328, and attached to a valve drum 330 formed with openings 331, 332 and 333, respectively, adapted to cooperate in a manner similar to the similar members of valve 309.

The valve housing 327 is formed with a pair of depending throats 334 from which extend laterally a pair of throats 335, to which are attached a pair of throats 337 extending from a valve housing 338, formed with a second pair of throats 339 connected to a manifold 340 supplied from a water supply pipe 341.

The valve housing 338, constituting the housing for the double valve 310, contains a valve bushing 342, a second valve bushing 343 and a valve drum 344, rotatable in the bushing 343 and formed with openings 345, 346 and 347, respectively. The valve 310 operates similarly to the valves 308 and 309.

The valve housing 327 is secured to and supported by the shelf 305 which has attached thereto flanges 351 of a pair of depending tubes 352, forming elements of the charging tubes 306. The tubes 352 extend through the shelf 305, and are aligned with the throats 334, respectively. Telescoping over and slidable on each tube 352, is a sleeve 353 formed with a tapered lower end 354, against which is carried a gasket 355 secured by a ring 356, threaded on to the end of the sleeve 353. The tapered end 354 of the sleeve 353 is shaped to seat the gasket 355 snugly in the flared opening 138 in the inlet tube 108, when the sleeve is lowered.

The upper end of the sleeve 353 is formed with a threaded portion 360 carrying a threaded nut 361 bearing against a ring 362, which expands a gasket 363 against the adjacent portions of the tube 352 and the sleeve 353.

When the sleeve 353 is in its lowered position, the gasket 355 fits snugly against the flared portion 138 of the cylindrical section 135 of the inlet tube 108, and liquid-tight communication is provided between the inlet tubes 108 and the pulp tank 303, if the valves 308 and 309 are open, and between the inlet tube and the water supply pipe 341 if the valve 310 is open.

The valve 309 provides means for manually adjusting the resistance to the flow of pulp suspension from the pulp tank, and thus the rate of flow during the time the valve 308 is open can be controlled in accordance with varying conditions.

*Charging mechanism control*

The control mechanisms for the several station mechanisms are all driven from the main control shaft 28 (Figs. 2 and 3) by a bevel gear 60, carried on the upper end of the main control shaft 28, and retained by a nut 61. Disposed on the upper wall of the drum 13 is a cover 62 which encloses the gear 60 and the gears associated therewith.

Figure 10:
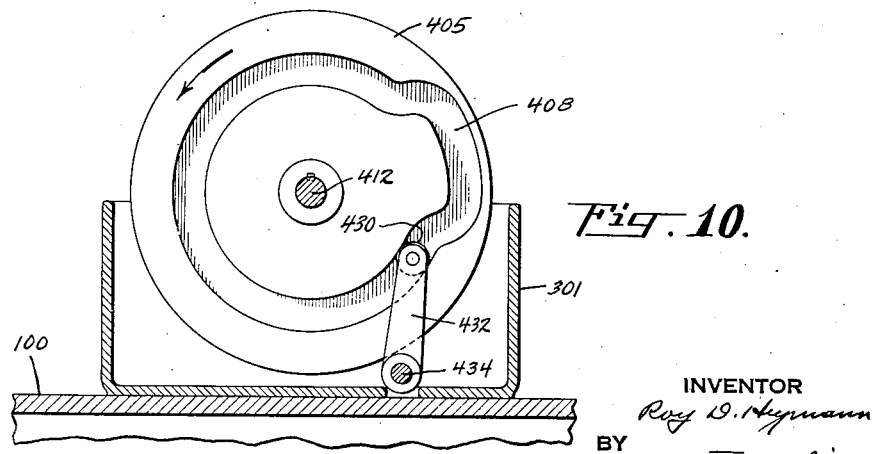
Fig. 10 is a vertical cross-section taken along the line 10—10 of Fig. 2, showing a portion of the charging mechanism control.

The control mechanism for the charging mechanism comprises a bevel gear 401 (Figs. 2, 8 and 10), carried on a horizontal shaft 402 journalled in bearings 403 and 404 formed integral with the bracket 301. Carried on the outer end of the shaft 402 is a cam wheel 405 provided with cam grooves 406, 407 and 408.

Cooperating with the groove 406 is a cam roll 409 carried on a crank arm 410 by a pin 411. The crank arm 410 is mounted on the end of a shaft 412 journalled in the bearings 414 and 418 in the housing portion 304 and the shelf portion 305. Secured to the shaft is a push crank 415 provided with a T-shaped head portion, carrying push pins 416 passing through the lugs 417 upstanding from the clevis members 419, rotatably mounted on the shaft 412. Disposed between the head portion and the lugs 417 are coiled springs 420.

The push crank 415 is rigidly secured to the shaft 412 and, upon rotation of the shaft in a counterclockwise direction (as viewed in Fig. 8), acts through the springs 420 resiliently to push the lugs 417 to rotate the clevis members 419 with the shaft 412. The push pins 416 are formed with heads 421 which engage the lugs 417, when the push crank 415 is rotated back in a clockwise direction, to carry the clevis members 419 along with the push crank 415.

The clevis members 419 are formed with forked portions 422 carrying pins 423, which enter blocks 424 seated in circumferential grooves constituted by flanges 365, 366, formed integral with the sleeves 353. Thus, when the clevis members are rotated with the shaft 412, the forked portions act through the blocks 424 to raise or lower the sleeves 353, accordingly.

The operation of the raising and lowering of the sleeves 353 will now be understood readily. As the cam 405 is rotated, the cam roll 409 follows the groove 407, and causes the crank 410 to rotate the shaft 412 in a counterclockwise direction (as viewed in Fig. 8). The rotation of the shaft 412 effects an angular movement of the push crank 415, which acts through the springs 420 to rotate the clevis members 419, in a counterclockwise direction with the shaft 412, thus lowering the blocks 424 which carry with them the sleeves 353. The members are so designed as to provide an overthrow action, and the push crank 415 continues to move after the sleeves 353 seat in the openings 138 of the cylindrical sections 135 of the inlet tubes 108, whereby the sleeves 353 are firmly and positively seated under resilient pressure.

The valve 308 is operated through the agency of a cam roll 425 moving in the cam groove 407 of the cam 405. The cam roll 425 is carried by a pin 426 on a crank arm 427, which is secured to and actuates the valve drum 330.

Upon rotation of the cam 405 in a clockwise direction (as viewed in Fig. 8), the crank 427 is rotated in a clockwise direction to bring the openings 333 and 332 into registration with the opening 331, thus providing communication between the throats 326 and the throats 334.

The valve 310 is actuated from the cam 405 by a cam roll 430 moving in the cam groove 408, and carried by a pin 431 on one arm 432 of a bell crank 433 pivoted on a shaft 434. The shaft 434 is journalled in the housing 304, which is provided with an opening 435 to accommodate the shaft. The other arm 436 of the bell crank 433 is connected through a pin 437, slidable in a slot 438, to a crank 439 connected to and operating the valve drum 344.

Upon suitable rotation of the cam 405, the bell crank lever 433 is rotated in a counterclockwise direction, (as viewed in Fig. 8), to actuate the toggle constituted by the crank arm 436, the pin 437 and the crank arm 439, to rotate the valve drum 344 in a clockwise direction, and bring the openings 347 and 346 into registration with the opening 345, formed in the valve bushings 342.

The rise of the cam groove 408 and the leverage of the bell crank lever 433 are so designed that the valve 310 opens very rapidly. In some installations, a quick-acting, plunger-operated, tappet valve may be employed in place of the rotary type of valve shown.

The complete operation of the charging mechanism is as follows:

The cam 405 is continuously driven from the main driving shaft 28, as above described, and the cam roll 409 is suitably moved by cooperation with the groove 406 to effect movement of the sleeves 353 into engagement with the inlet tubes 108, whereafter the cam roll 425 is moved by co-action with the groove 407 to open the valve 308 to permit the pulp suspension to flow from the pulp tank 303 through the throats 315, 323, 326 and 334, into the tubes 352, and from thence through the sleeves 353 into the inlet tube 108. After a predetermined period, the cam roll 430 is suitably moved to actuate the mechanism connected thereto, and open the valve 310, thus permitting the flow of water from the water supply pipe 341, through the throats 339, 337, 335 and 334, and into the tube 352 and the inlet tube 108, as described. Immediately after the valve 310 is opened, the valve 308 is closed in the manner above-described. When the valve 310 is again closed, the cam roll 409 moves to lift the sleeve 353, as above described.

The principal function of the inlet tubes is to provide a reservoir for the liquids supplied to the molds at the charging station, whereby sufficient liquid is contained by the inlet tubes to ensure the mold cavities remaining filled with liquid during the movement of the mold from station 1 to station 2.

*Air control mechanism*

The mechanism at station 5 is taken as typical of the mechanisms at stations 2, 3, 4 and 6, and is identical therewith, except as to details of the supporting arrangement which will be hereinafter pointed out.

The air control mechanism (Fig. 3) is supported from a bracket 501 mounted on the top of the drum 13, and provided with an arm 502, which supports one end of the pulp tank 303. Extending from, and integral with, the bracket 501, is a housing 503 and an overhanging bracket 504 in which is carried air ducts 505 identical in construction.

Each air duct 505 is carried in a depending cylindrical flange 507 formed integral with the bracket 504, and supporting a bushing 508. Slidable in the bushing 508 is a sleeve 509, into which is telescoped a cylindrical valve housing 510. The valve housing 510 is slidable with respect to the sleeve 509 against the compression of a spring 511 contained within these members, and seated against a spider 512 formed integral with the sleeve 509, and a circular flange 514 integral with the valve housing 510. The valve housing 510 is retained in the sleeve 509 by a ring 515 threaded on to the upper end of the sleeve 509, and compressing a washer 516 against an external shoulder 517 formed on the valve housing 510.

The lower end 520 of the sleeve 509 is tapered and has lying thereagainst a gasket 521 secured by a ring 522 threaded on to the sleeve 509. The tapered end 520 of the sleeve 509 and the gasket 521 are shaped and positioned to fit into the flared upper end 138 of the cylindrical section 135 of the inlet tube 108, to provide an air-tight seal between the air duct 505 and the inlet tube 108, when the sleeve 509 is lowered.

The upper end of the valve housing 510 is closed by a flanged head 523 threaded into the upper end of the valve housing 510, and compressing a gasket 524 against a flange 525 formed on the upper end of the valve housing 510. Threaded into the head 523 and communicating with the interior of the valve housing 510, is a conduit 526 connected through a manifold 527 to a suitable source (not shown) of compressed air.

The valve housing 510 is formed with an internal circular flange 530 supporting a valve seat member 531, having an opening 532 closed by a tappet valve 533, integral with a valve stem 534 slidably guided in a cylindrical guide 535, integrally supported from the valve housing by a spider 536. The valve 533 is seated by a coil spring 537 bearing at one end against the guide 535, and at the other end against a split collar 538, carried on a reduced neck portion 539 of the valve stem 534.

Threaded into the central portion of the spider 512 is a valve-lifting pin 540 adjustably positioned by a nut 541. The valve-lifting pin 540 is positioned to engage the lower end of the valve stem 534 and prevent the valve 532 from moving downwardly with the valve housing 510, thus lifting the valve 532 from its seat 531 when the valve housing 510 moves downwardly from the position in which it is normally retained by the spring 511.

The housings 510 are actuated from the main control shaft 28 by bevelled gear 60 and a bevelled gear 550 carried on a horizontal shaft 551 journalled in bearings 552 and 553 integral with the bracket 501. Carried on the outer end of the shaft 551 is a cam 554 formed with a cam groove 555, with which cooperates a cam roll 556. The cam roll is carried by a pin 557 on a crank arm 558 fixed to a shaft 559, journalled in the housing 503, to which shaft is attached a pair of clevis members 560, each having forked arms 561 receiving the valve housing 510 and carrying the pins 562 entering blocks 563, slidable in ways formed by the flange 525 and a flange 564.

Figure 14:
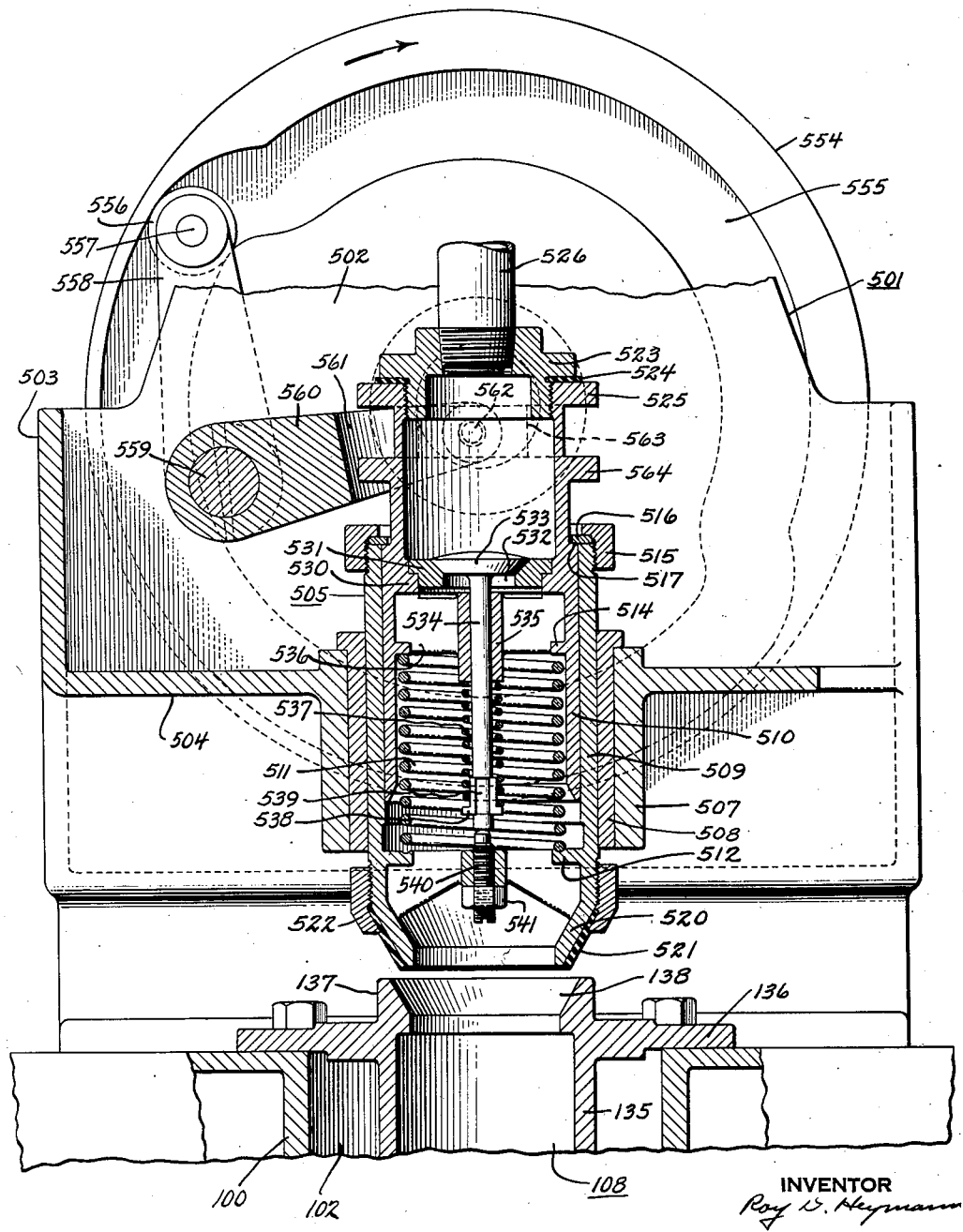
Fig. 14 is a vertical cross-section taken along the line 14—14 of Fig. 3, showing the air control mechanism.

The sleeves 509 are brought into engagement with the inlet tubes 108 by the rotation of the cam wheel 554, in a clockwise direction (as viewed in Fig. 14). When the cam wheel 554 is rotated, the cam roll 556 effects a clockwise angular movement of the crank arm 558 and the clevis members 560, to drive the valve housings 510 downwardly. The downward movement of each of the valve housings 510 effects a similar downward movement of each sleeve 509 until the tapered lower end 520 seats in the flared open end 138 of the inlet tube 108. Continued downward movement of the valve housing 510 causes it to slide in the sleeve 509 against the compression of the spring 511, and the movement of the valve 533 is prevented by the valve-lifting pin 540, whereupon the valve seat 531 is moved away from the valve, to open the valve. Upon further rotation of the cam 554, each of the clevis members 560 is moved angularly in a counterclockwise direction, and lifts its valve housing 510. The action of the spring 511 prevents the sleeve 509 from being disengaged from the inlet tube 108 until the shoulder 517 engages the washer 516, at which time the valve 533 has seated in its seat 531 to close the valve opening 532.

The mechanisms at stations 2, 3 and 4 are identical in all respects to that at station 5, with the exception that the brackets 500 secured to the upper face of the drum 13 at stations 2, 3 and 4 do not have an upwardly extending arm similar to the arm 502 on the bracket 501. The mechanism at station 6 is identical with that at stations 2, 3 and 4, except that the bracket 599 has formed integral therewith the bracket 20, described previously, which supports the driving gears.

In the present embodiment of the invention, the supply manifold 570 at station 2 is connected to a source of supply of low pressure air, which is slightly heated, as will hereinafter be described, and the manifolds 527 at stations 3 to 6 are connected to sources of high temperature, high pressure air, as will later appear.

The use of air as a pressure fluid has been mentioned as illustrative, but the machine may be employed to perform a molding process wherein other pressure fluids are used. Superheated steam has been found especially desirable as a pressure fluid, and certain inert gases such as carbon dioxide, the rare gases and others may be used. Thus, where the term "air" is used, it will be understood that other pressure fluids may be substituted.

Discharge station

In the present embodiment, the discharge station 7 is shown as being free of any mechanism, it being assumed that the finished molded articles will be removed by hand, but it is within the contemplation of the invention to dispose a suitable mechanism at this station for automatically removing the finished products.

Spray mechanism

Disposed adjacent the outer periphery of the turntable B, and at approximately the level of the mold, is a spray gun 601, secured by an adjustable support 602 to a vertical standard 603. The spray gun 601 consists principally in a nozzle 604 supplied with lubricating oil from a reservoir 605 by a connecting pipe 606, and having an adjusting valve 607. The nozzle 604 is supplied with compressed air from a source (not shown), through a pipe 610, having therein an air valve 611, carried on a supporting bracket 612 fixed to the upper surface of the drum 13.

The valve 611 is controlled by a push rod 615 actuated by a lever 616 pivoted to the bracket 612 and acting against the force of a spring 618. The free end of the lever 616 is forced out by the spring 618 into the path of movement of the flange 136 of the inlet tubes 135, whereby, when the mold assembly D is in position at station 8, the lever 616 is forced toward the valve 611, to open the valve 611. When any particular mold reaches the station 8, the mold 105 is in open position (as shown in Fig. 16), and in a position to receive the spray from the spray gun 601. Thus, as the mold assembly D is moved into position at station 8, and the valve 611 is opened to supply compressed air to operate the spray device 601, a fine film of oil is deposited on the surface of the mold 105. The film of oil on the inner surface of the mold prevents the pulp fibres from adhering thereto, and thus there is no breaking away of the fibres from the wall of the article when the mold is opened.

General operation

For the purpose of illustration, let it be assumed that one of the mold assemblies D is in position intermediate station 8 and station 1. The drive pulley 22 is rotated from a suitable driving device (not shown), and actuates the reducing gear mechanism D to rotate the main drive shaft 28. The main drive shaft operates the intermittent drive mechanism F, to rotate the ring gear 103, thus rotating the turntable B in a counterclockwise direction (as viewed in Fig. 1), with respect to the support A. The mold-closing mechanism is actuated through the coaction between the cam 70 and the cam rolls 170 and 233, to close the mold 105 in the manner above-described.

When the mold assembly D reaches station 1 and the turntable B comes to rest, the cam 405 operates to depress the sleeves 353 of the charging tubes 306 into engagement with the inlet tubes 108, whereafter the valve 308 is opened to permit the pulp suspension to flow under the force of gravity from the pulp tank 303 into the inlet tubes 108, and from thence into the mold cavities 106 to fill the cavities 106 and the inlet tubes 108.

The dwell of the cam maintains the valve 308 open for a predetermined period, whereafter the valve 310 is opened for a predetermined period to permit pure water to flow from the supply pipe 340 into the inlet tubes 108 of the mold cavities 106, to provide a flushing action on the fibres deposited in the mold 105. The valve 308 is generally closed immediately after the valve 310 is opened, but the relative times of opening the valve 310 and closing the valve 308 are selected in accordance with the requirements of the particular process being carried out. When the pulp suspension is introduced into the mold 105, the water escapes through the screen and the openings in the mold bottom, sides and top, and the pulp fibres are deposited in the inner side of the screen.

Further rotation of the cam 405 effects the closing of the valve 310 and the lifting of the sleeves 353 of the charging tubes 306, whereafter the drive mechanism C rotates the turntable B in a counter-clockwise direction one-eighth of a revolution to bring the mold D assembly into position in station 2.

When the turntable B comes to rest at station 2, the continuously rotating cam 554 causes the sleeves 509 of the air ducts 505 to be depressed into engagement with the inlet tubes 108, and the valves 533 are thereafter opened to permit air to flow from the air supply manifold 570, under suitable pressure, which air is heated by suitable means (not shown), prior to reaching the supply manifold 570. The pressure of the air compacts the blanket of pulp fibres, and forces a substantial portion of the water therefrom. At the end of a predetermined period, the cam 554 operates to close the valves 533, and to lift the sleeves 509 of the air ducts 505 out of engagement with the inlet tubes 108, and the turntable B is thereafter rotated one-eighth of a revolution to bring the mold assembly D into position at station 3.

The operation at station 3 is identical with that at station 2, except that the air supply through the manifold 570 at station 3 is at a relatively high pressure, and is preheated to a relatively high temperature, whereby it strongly compresses the blanket, and heats it to dry it but insufficiently to scorch it.

The operation at stations 4, 5 and 6 are identical with the operation at station 3, and, when the mold group is moved out of station 6, the article formed in the mold is completely dried and has its final form. The plurality of drying steps are provided in order to subject the fibres to the drying effect of the heated air for a sufficient period of time to completely dry the article in the mold. However, where complete drying is not desired, one or more of the drying steps may be omitted.

During the movement of the turntable B to carry the mold assembly D from station 6 to station 7, the mold-opening mechanism operates to open the mold 105 by lowering the bottom supporting bracket 156 and separating the side supporting brackets 201, whereby, when the mold group D reaches station 7, the mold is fully opened and the finished articles may be removed in any convenient manner.

Further rotation of the turntable B brings the open, empty mold 105 into station 8, in which position the mold 105 is sprayed with a suitable liquid lubricant, in the manner above described, to completely coat the interior surfaces of the bottom and sides with a fine film of lubricant, whereby the mold is in condition to receive pulp fibres to form the article without the article adhering to the mold when the latter is opened, after completion of the final drying step at station 6.

Each mold is subjected to the above-described cycle of operations, and, after a complete cycle, is ready to be subjected to a similar cycle. The mold groups D are so positioned that when the turntable B is halted with a mold at any of the stations, the other seven molds are at the other seven stations. Thus all of the station mechanisms operate simultaneously, but upon different molds, and each mold is brought successively into operative registration with the several station mechanisms.

From the foregoing it will be seen that the apparatus herein disclosed constitutes a machine wherein a complete molding process can be carried out without necessitating the removal of the article to be formed until it is completely formed. This arrangement permits the molding of articles of various types in a minimum time, and with the minimum amount of handling, inasmuch as the mold, after once being closed at the beginning of the operation, need not be opened until the article is completely formed, and the article need not be handled until it is in its final condition and ready for shipment or use.

Inasmuch as the several station mechanisms operate simultaneously upon different molds, the maximum utilization of the mechanisms is possible, the only period of idleness of the mechanisms need be the period during which the turntable is rotated to move the several molds between succeeding stations. This arrangement provides maximum utilization of both the molds and station mechanisms, and furthermore provides for maximum capacity of the entire apparatus.

It will be obvious that the apparatus constructed according to the present invention, of which one embodiment is herein disclosed, is capable of adaptation to other processes than the specific process herein shown. A greater or lesser number of stations may be provided, or the steps of the process may be divided differently, so as to be carried out at different stations, as herein shown. For example, several complete steps may be carried out at a single station, or a single step may be divided and carried out at several successive stations.

It will further be apparent that the specific machine herein shown can readily be modified for forming articles of various shapes, without any substantial change in the mechanism. The bottom and side mold plates may be removed from their respective supporting members, and mold plates having a different size and/or shape readily may be substituted to permit articles of various shapes and sizes to be formed. Also, considerable latitude is possible in the process without substantial change in the apparatus, in that several station mechanisms are readily removable from the supporting drum within a few minutes, and with simple tools and any one of the several stations can be removed and shifted to other stations, or be replaced by other forms of station mechanisms. For example, any one of the air-charging station mechanisms could, if desired, be replaced by a liquid-charging mechanism similar to that disposed at station 1 in the embodiment disclosed, for carrying out an additional liquid-charging step; or any one, or several, of the air-charging station mechanisms could be eliminated if a lesser number of drying steps were required; or a suitable mechanism could be provided at one or more stations for carrying out an additional step or steps such as impregnating or coating the fibres.

A further advantage of the invention resides in the construction of a machine wherein all of the moving parts may be driven from a single drive shaft, thus permitting the use of a minimum number of separate members, and insuring that the several control mechanisms will all be operated in the proper sequence, and for the proper periods of time. The mechanism permits a complete molding operation to be carried out and controlled automatically, and substantially without attention from an operator.

What is claimed is:

1. In a machine for making molded pulp articles, a turntable rotatable about a vertical axis, and having thereon eight positions, a stationary support having eight stationary stations corresponding with said positions, a sectional mold mounted on said turntable in each position thereof, means for intermittently driving said turntable to bring each position successively into registration with each of the several stations, said first station having means for filling the molds with a liquid suspension of pulp, said second station having means for applying comparatively low pressure and low temperature heated air to the molds, said third station having means for applying high pressure and high temperature air to said molds, said fourth, fifth and sixth stations being identical with said third station, means for opening the molds between said sixth and seventh stations, said eighth station having means for applying an oil spray to the open mold, and means for closing the mold between said eighth and first stations.

2. Apparatus for molding pulp, comprising, in combination, a stationary support, a series of station mechanisms on said support, a turntable rotatable on said support, a hollow mold on said turntable having a charging opening, means for rotating said turntable to bring said mold successively into registration with said station mechanisms, at least one of said mechanisms having means for charging said mold with a liquid, and an inlet tube on said turntable registering with said charging opening and communicating with said mold for supplying liquid to said mold at least during the movement of said mold between two station mechanisms.

3. Pulp molding apparatus comprising, in combination, a spray nozzle, an oil source, an air source, means connecting said sources to said nozzle, a control valve for said air supply, a mold, means for moving said mold into and out of position before said nozzle, and means active when said mold is in position before said nozzle for actuating said control valve.

4. Apparatus for molding pulp, comprising, in combination, a stationary support, a turntable rotatable on said support, means for rotating said turntable to carry said mold into and out of a predetermined position, a mold carried on said turntable, a spray nozzle disposed adjacent said turntable in a position to spray said mold when in said predetermined position, means actuated by the movement of said mold for controlling said spray nozzle, and means for supplying oil to said nozzle.

5. Apparatus for molding pulp, comprising, in combination, a stationary support, a plurality of spaced station mechanisms thereon, the first of said station mechanisms including a fixed pulp reservoir, a charging tube connected thereto, a water inlet connected to said charging tube and valves for controlling the flow of pulp and water to said charging tube, a turntable rotatable on said support, a plurality of spaced molds carried by said turntable, means for rotating said turntable to bring said molds into registration with said station mechanisms successively, and inlet tubes carried by said turntable and communicating with said molds respectively, said inlet tubes being adapted to register with said charging tubes successively and to supply liquid to said mold during movement from said first station mechanism to the succeeding station mechanism.

6. A machine for molding articles from pulp, comprising, in combination, a stationary, upright, drum-like support having an opening in the side wall, a plurality of station mechanisms, an annular turntable encircling and rotatable on said support, a plurality of molds depending from said turntable and arranged circumferentially around said support, means for rotating said turntable to bring said molds successively into registration with said station mechanisms, said means including a main drive shaft mounted within said support, an intermittent driving mechanism disposed principally within said support and including a pinion extending through said opening, a ring gear encircling said support and meshing with said pinion, and means securing said ring gear to said turntable.

7. In apparatus for molding pulp, in combination, a supporting frame, a table rotatable on said frame, a separable mold including a plurality of mold sections, supporting members movably mounted on said table and supporting said sections for movement into and out of engagement in closed position, means adjustably mounting said mold sections on said supporting members respectively for movement toward and away from said supporting members, means controlled by the rotation of said table for moving said supporting members, and means for maintaining at least certain of said sections together in closed position independently of said means for moving said supporting members, said maintaining means including a tongue on one of said supporting members and a groove on another of said supporting members having inclined engaging surfaces adapted to exert a wedging action when said supporting members are moved toward mold-closing position.

8. Apparatus for molding pulp, comprising, in combination, a support, a turntable rotatable on said support, a separable mold having a plurality of sections movable between open and closed position, brackets on said turntable and having ways thereon, blocks slidable in said ways, mold-section supporting brackets pivotally carried by and depending from said blocks for supporting said mold sections for movement on said turntable, and means for moving said second-named brackets substantially with translatory movement thereby to move said sections between open and closed position, said last means being operative to inhibit substantial angular movement of said second-named sockets.

9. In combination, in apparatus for molding pulp, a support, a mold including a plurality of separable sections adapted to be moved into engagement in mold-closed position, a carrying frame for each of said mold sections, means adjustably mounting said sections on their respective frames for movement toward and away from said frames whereby the sections may be adjusted to bring them into alignment when in their meeting positions, means supporting said frames on said support for movement between mold-open and mold-closed positions, and interengaging means on said frames for locking them in mold-closed position.

10. Apparatus for molding pulp including a hollow drum-like support, a turntable mounted on said support and having at least a portion encircling said support, a plurality of molds carried by said turntable and depending therefrom around said support, a ring gear carried by said encircling portion of said turntable, said support having an opening adjacent said gear, driving gearing disposed within said support and having a pinion disposed principally within said support and extending partially through said opening in said support and meshing with said ring gear, and means for energizing said driving gearing.

ROY D. HEYMANN.